(12) United States Patent
Hemingway et al.

(10) Patent No.: US 7,193,153 B2
(45) Date of Patent: Mar. 20, 2007

(54) PENETRATION FIRE STOP DEVICE

(75) Inventors: Jeffery Hemingway, Burlington, CT (US); Brian Takiff, New Britain, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 11/218,000

(22) Filed: Sep. 1, 2005

(65) Prior Publication Data

US 2006/0060369 A1    Mar. 23, 2006

Related U.S. Application Data

(63) Continuation-in-part of application No. 10/783,941, filed on Feb. 20, 2004, now abandoned.

(51) Int. Cl.
*H01H 9/02* (2006.01)
(52) U.S. Cl. .................. 174/58; 174/60; 174/17 R; 174/135; 174/64; 439/535; 248/906
(58) Field of Classification Search .......... 174/58, 174/60, 135, 17 R, 64, 17 CT; 220/4.02, 220/3.8; 439/535; 248/906
See application file for complete search history.

(56) References Cited

U.S. PATENT DOCUMENTS

| 2,558,610 | A |  | 6/1951 | Diekhoff | 200/138 |
| 2,599,569 | A |  | 6/1952 | McLarty | 200/122 |
| 2,684,994 | A |  | 7/1954 | Kwake | 174/51 |
| 3,676,571 | A |  | 7/1972 | Rubinstein | 174/65 |
| 4,655,422 | A | * | 4/1987 | Kelsall | 248/56 |
| 6,176,052 | B1 |  | 1/2001 | Takahashi | 52/232 |
| 6,232,553 | B1 | * | 5/2001 | Regen | 174/64 |
| 6,252,167 | B1 | * | 6/2001 | Rose | 174/66 |
| 6,597,275 | B2 |  | 7/2003 | Morrow et al. | 337/381 |
| 2004/0093814 | A1 |  | 5/2004 | Cordts et al. | 52/220.8 |

FOREIGN PATENT DOCUMENTS

| FR | 2819877 | 1/2001 |
| JP | 53067094 | 6/1978 |
| WO | WO2004/ 046597 A1 | 3/2004 |

\* cited by examiner

*Primary Examiner*—Dhiru R. Patel
(74) *Attorney, Agent, or Firm*—McCormick Paulding & Huber LLP

(57) ABSTRACT

Fire Stop devices, for walls having cables that run through a wall opening, are provided on exposed ends of a conduit placed in the wall opening. Each fire stop device has a hollow housing fitted to the exposed end of the conduit, and a front wall of the housing has moveable cable clamping jaws to minimize the size of the slot through which the cables are provided. Intumescent material is provided inside the hollow housing. The rear wall of the housing has a separable back plate that contacts the conduit at only limited abutment surface to minimize heat transfer from the conduit to the housing. In a retro-fit version of the device the housing has a separable top and bottom housing portions.

14 Claims, 10 Drawing Sheets

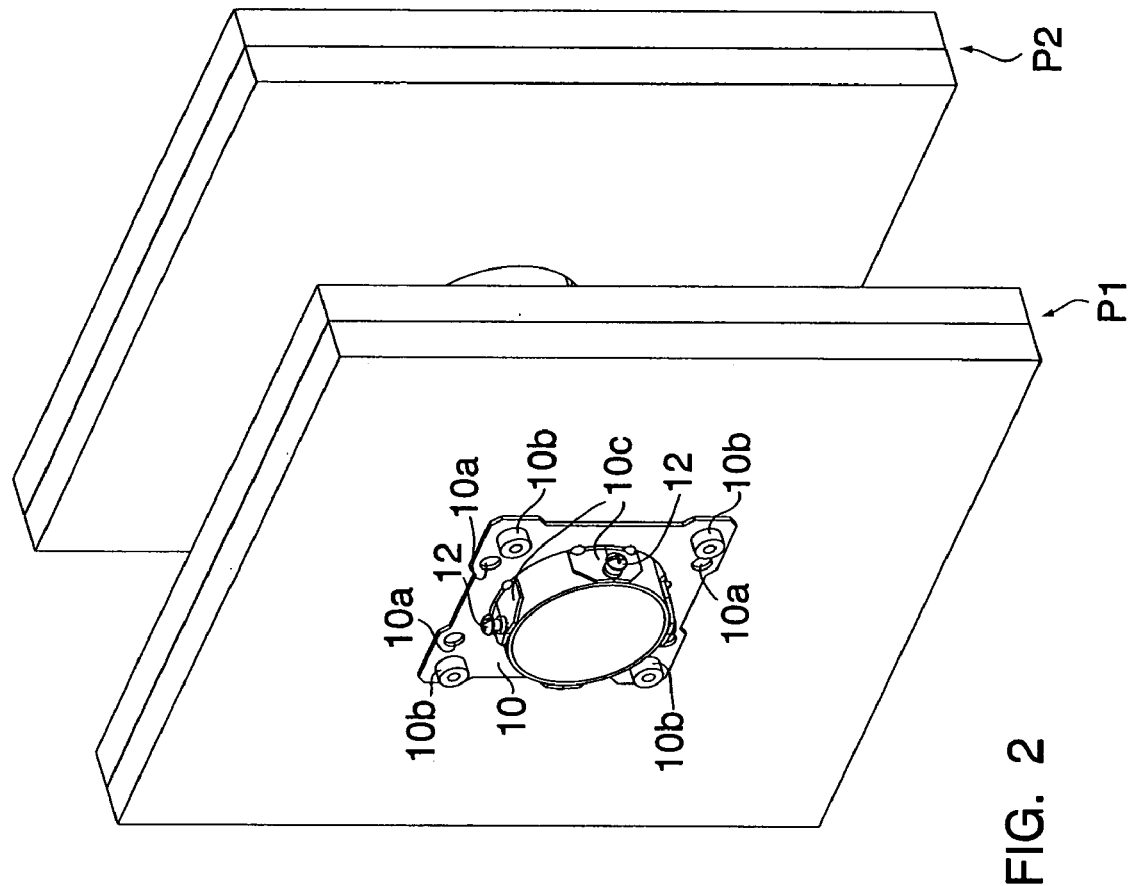
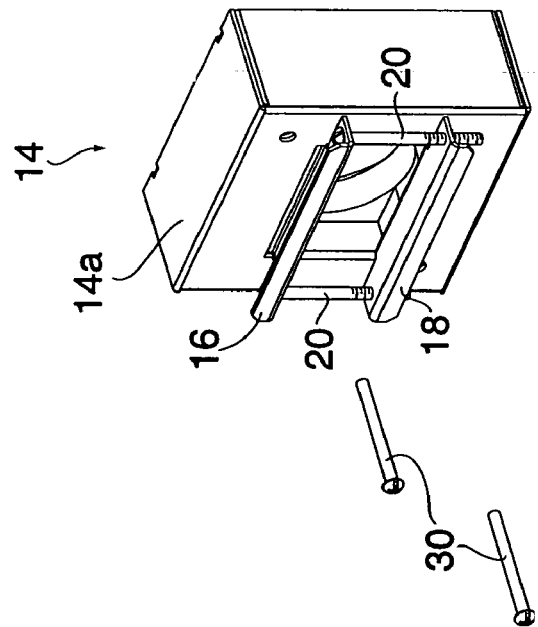
FIG. 2

Determine location and drill pilot hole thru wall.

Drill hole using 4 3/4" [120mm] for FS4 and 2 1/4" [58mm] for FS2.

Measure wall thickness.

Insert EMT sleeve through wall. EMT Length = Wall thickness + 1 1/4" [32mm].

Secure mounting brackets to EMT sleeve on each side of wall.
Optional: Secure mounting bracket to the wall using sheet rock screws.

Assemble boxes on each side of wall.

Tighten acorn nuts.

Install cabling then adjust sliding doors to be snug around cables by turning side screws.

CAUTION: Over tightening may damage cabling.

Points of Contact

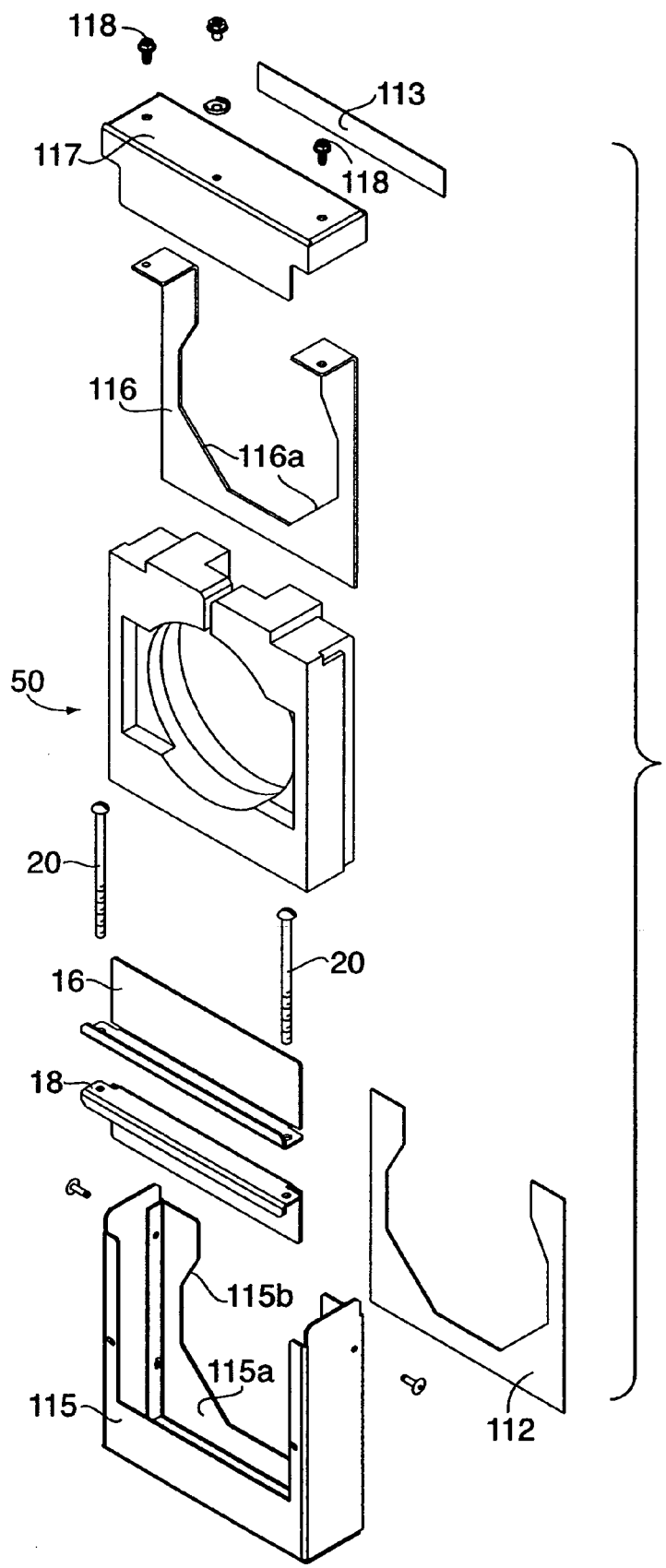

PENETRATION FIRE STOP DEVICE

CROSS-REFERENCE TO RELATED APPLICATIONS

This application is a Continuation-In-Part of an earlier Application bearing the same title and filed Feb. 20, 2004 under Ser. No. 10/783,941 now abandoned. That earlier application is summarized herein, and is incorporated herein by reference. Priority to said earlier application is claimed in the declaration filed in this Continuation-In-Part application.

BACKGROUND

Conduits or short sections of pipe are often provided in a wall structure, such as a concrete block wall or gypsum board wall structure, in order to carry cables and wires from one area of a building to another. The national fire code dictates certain requirements for preventing the passage of air through such a conduit, and any associated opening. The present invention seeks to minimize the flow or hot gasses through a conduit in such a situation, by providing a fire stop device at one or both sides of the wall structure.

In the parent case identified above a wall structure is fitted with a fire stop device of the present invention at the time of construction for the wall. More particularly, a conduit or pipe is provided in an opening in the wall, and the fire stop device of the present invention is mounted to at least one end of that conduit or pipe.

In further accordance with the present invention an improved fire stop device is provided which can not only be used in conjunction with new construction as set forth in the parent case, but which can also be utilized in a retro-fit situation, that is after construction has been completed, and more significantly, after the cable or wires have been run through an opening in the wall. This retro-fit device assures that an existing structure can be brought up to code. The present invention allows for a split conduit to be provided around wires already laid up through a wall opening. The improved fire stop device of this retro-fit configuration is mounted on the end of such a split conduit as disclosed for the first time in the present application.

SUMMARY OF INVENTION

The present invention relates to penetration fire stop devices, and deals more particularly with a device that can be utilized either in new construction, where a one piece conduit is provided in a wall opening, or which can also be adapted for use in a retro-fit situation where a split conduit can be provided if required to surround the cables and wires passing through the opening in an existing wall structure. The improved version also is adopted for use within an existing wall structure having a standard size conduit in the wall. A device for use in any of these above-described situations is disclosed, and comprises a housing, which is preferably rectangular in configuration, means for securing the housing to at least one end of a conventional, or a split conduit. Said housing has a rear wall adjacent to the wall structure or spaced from the wall, if required, by a heat shield. The rear housing wall has an opening that communicates with the interior of the housing so that wires within the conduit pass through the housing. The rear wall is of U-shape to allow assembly of the U-shape bottom portion with another housing portion. Intumescent materials are provided in the rectangular housing, and wire clamping jaws are provided in the front side of the housing, opposite the side through which the conduit is received. These clamping jaws define an elongated slot for the wires. The wires pass through this slot in the front wall of the housing. The wire-clamping jaws serve to minimize the cross sectional area occupied by the wires passing through the front wall of the housing. The housing is preferably made from at least two components or portions; a lower portion which has a generally U-shape and which is also adapted to house intumescent material. The housing further includes a top portion designed to be assembled with the lower portion of the housing by an installer in the field. A split plate may be provided on wall structure to receive the housing rear wall and to surround the conduit. The rear wall of the housing may include a back plate with forwardly projecting flanges or tabs that serve to anchor the rectangular housing too the conduit, or directly to the wall structure, or to the split back plate. The split back plate may be used in conjunction with a heat shield secured to the wall structure around the conduit. The heat shield may be used to surround a projecting portion of the conduit.

BRIEF DESRCIPTION OF DRAWINGS

(FIG. 6 from the parent case)

FIG. 2 is an exploded view of the components illustrated in FIG. 1 (and corresponds with FIG. 8 from the parent application).

Figure 1:
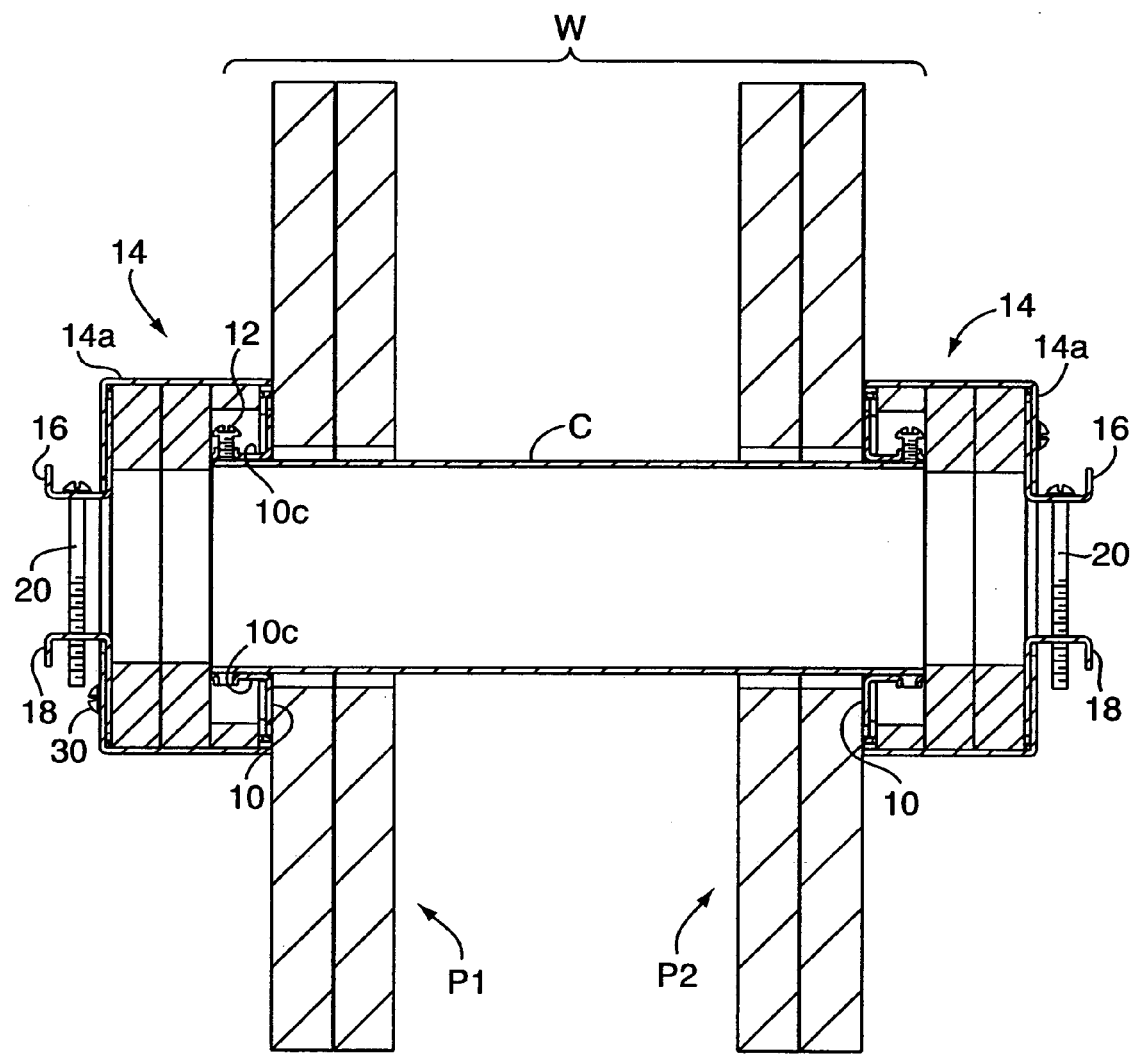
FIG. 1 is a vertical section taken through a gypsum wall board structure fitted with a one piece conduit C and having fire stop devices in accordance with the present invention mounted to oppositely projecting ends of conduit C that extend beyond the wall surface.

FIGS. 3A–3H inclusively illustrates the process of installation for the assembly depicted in FIGS. 1 and 2.

Figure 4:
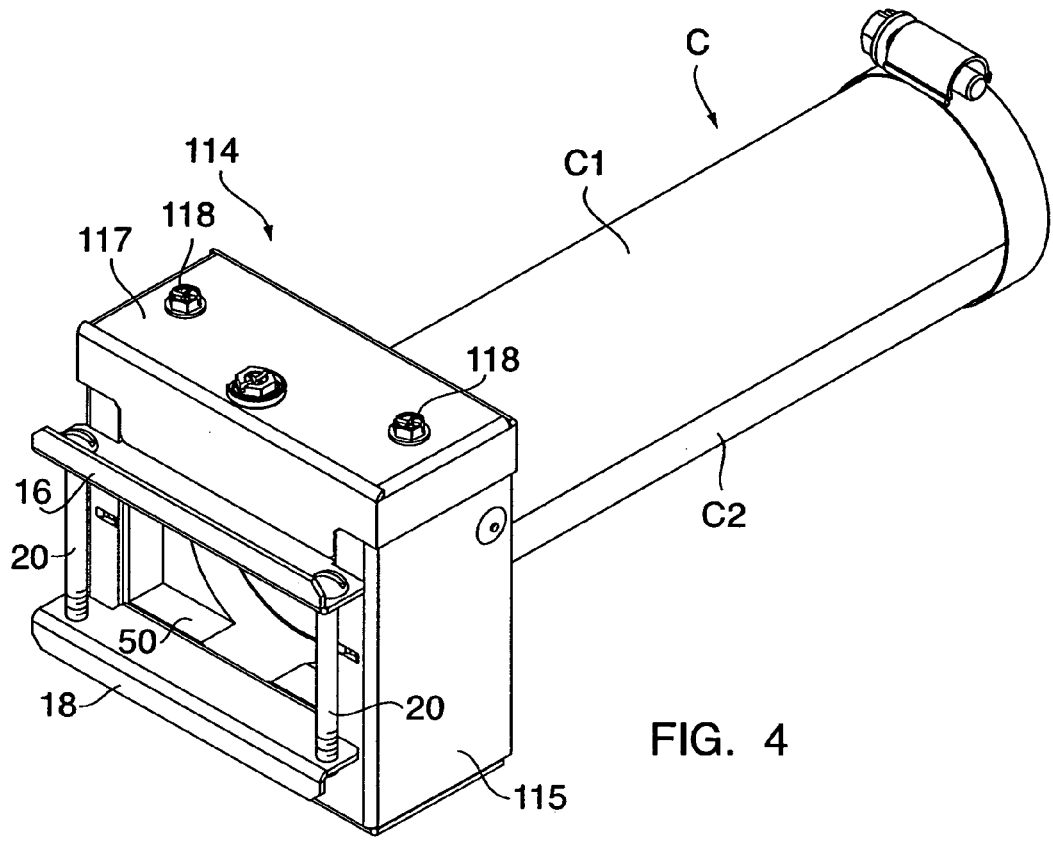

FIG. 4 is a front quartering perspective view, of a multi-component housing provided in an improved version of the present invention capable of use with an existing wall structure.

Figure 5:
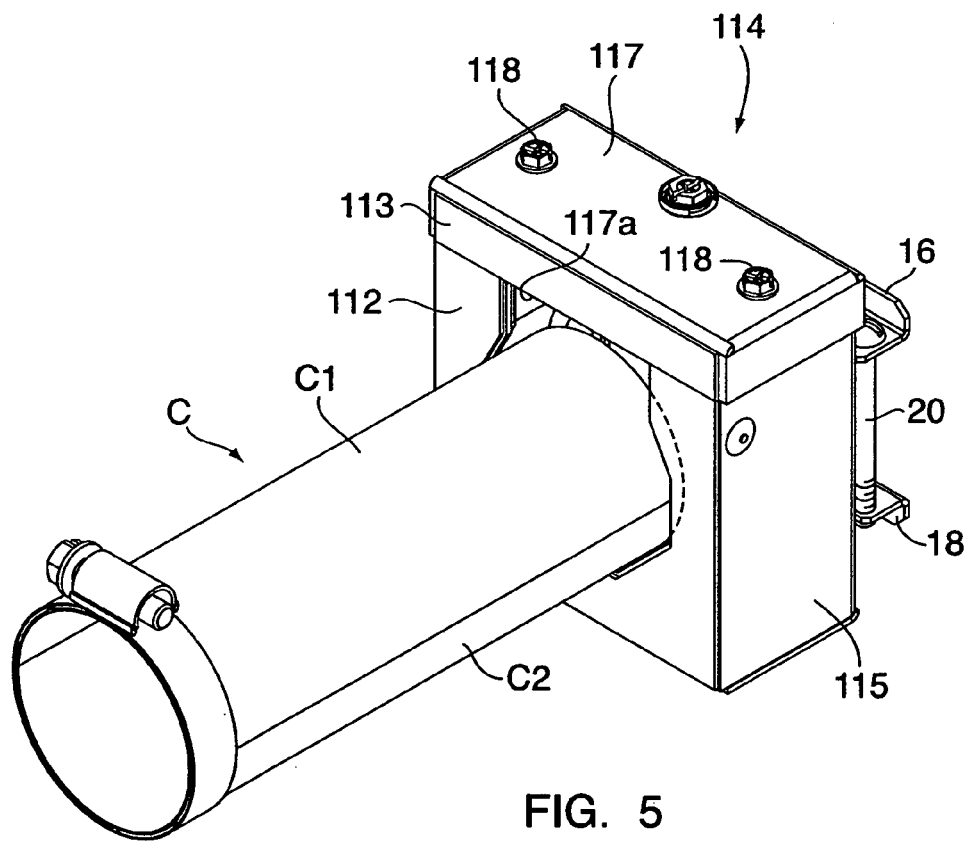

FIG. 5 is a rear quartering perspective view of the housing illustrated in FIG. 4. showing the split conduit, which would be placed in the wall structure around the cables prior to assembly of the housing components.

Figure 5A:
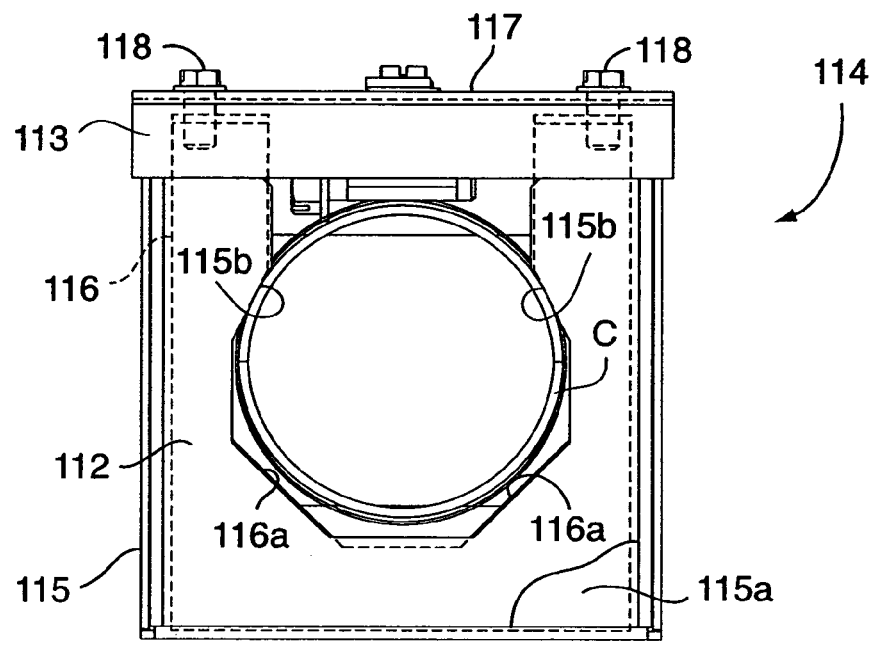

FIG. 5A is a rear view of the housing in loosely assembled relation to conduit C.

Figure 5B:
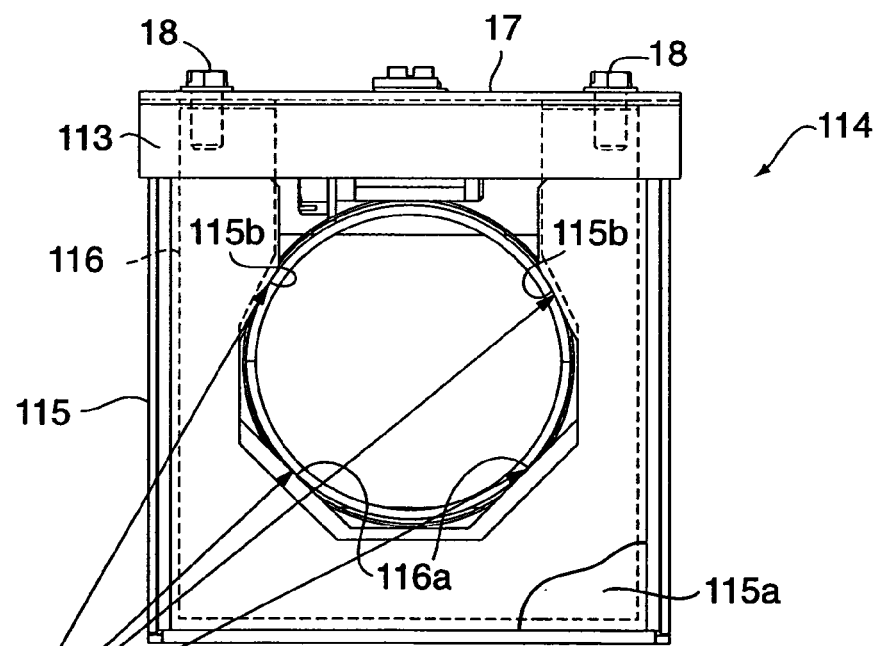

FIG. 5B shows FIG. 5A assembly after clamping screws 118, 118 having secured the back plate and housing rear wall to the conduit C.

FIG. 6 is an exploded view showing in perspective the various components making up the housing of FIGS. 4 and 5.

FIGS. 7A–7D show the steps required in a retro-fit installation of the FIGS. 4–6 components.

Figure 8:
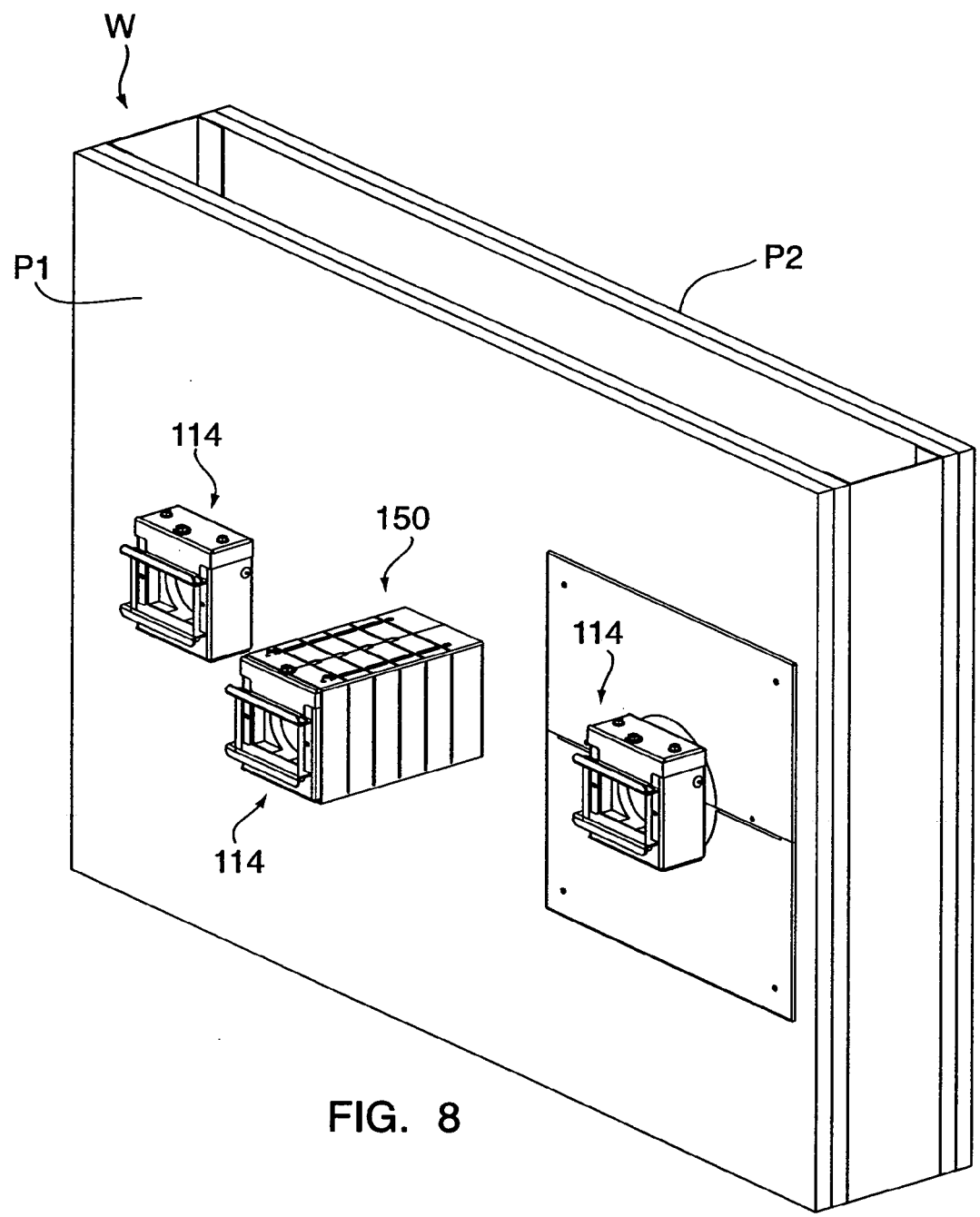

FIG. 8 shows three installations of the penetration fire stop device in a wall structure.

Figure 9A:
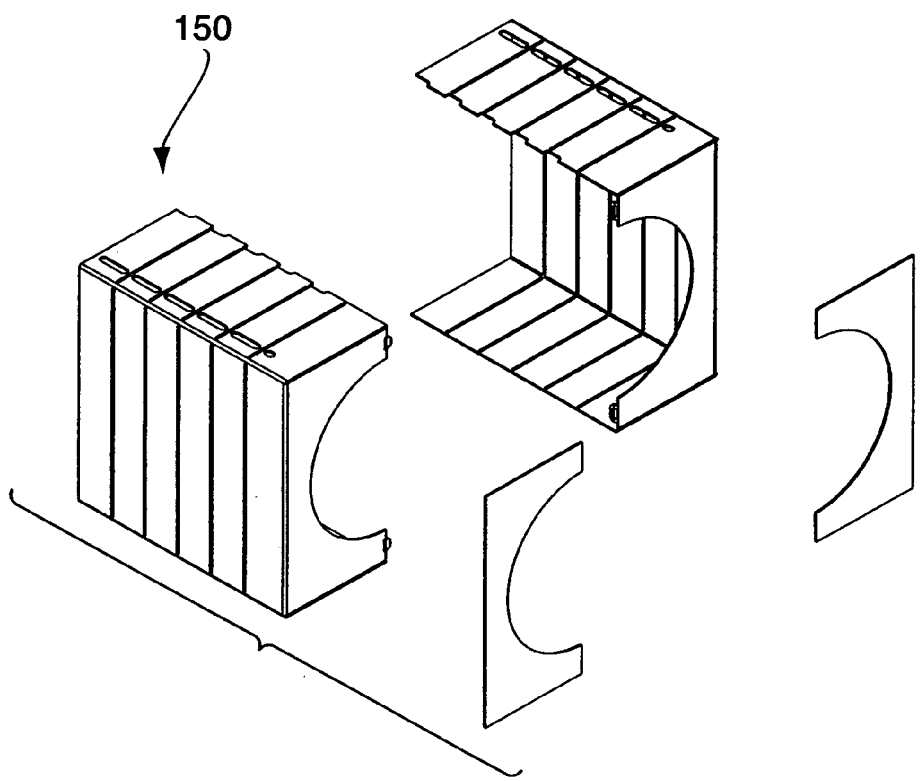
Figure 9B:
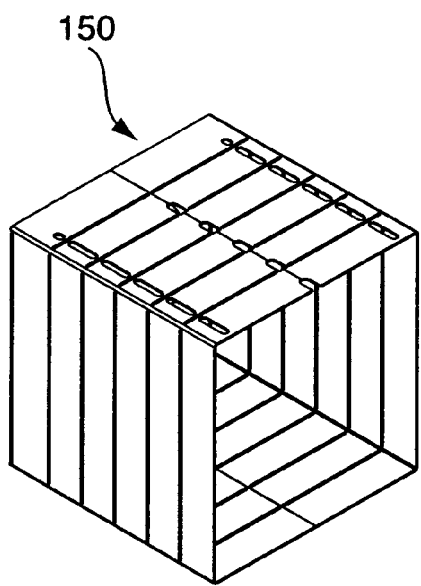
Figure 9C:
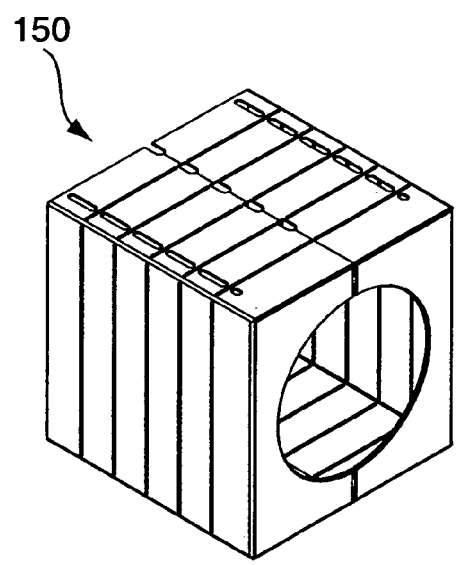

FIGS. 9A–C shows a heat shield of the type adapted for use as shown in FIG. 8.

DETAILED DESCRIPTION OF FIRST EMBODIMENT (FIGS. 1, 2 AND 3)

As best shown in FIG. 1, the wall structure is represented by two panels P1 and P2 which are spaced apart, and which have openings that receive a conduit C such that the conduit C extends beyond the outside of each of the panels into the interior of the building space(s) where the wall structure W is located.

A generally rectangular enclosure 14 is provided on the conduit C, and a rear or back wall 10 of the housing is first secured to the wall panel P1 by screws (not shown) that are received in openings 10a provided for this purpose. The rear wall or plate 10 further includes a plurality of bosses 10b that are adapted to receive screws 30 for securing a front portion 14a of the rectangular housing to the back plate 10 after securing the plate 10 to the wall structure. The back plate 10 also includes four circum-axially spaced forwardly projecting tabs 10c, 10c that are adapted to receive screws 12, 12 for anchoring the back plate 10 to the conduit C. The assembled configuration for these components is best shown in FIG. 1, which is a sectional view through the wall structure, and illustrates the rectangular housing 14 as including a front portion 14a having a front wall that has a slotted opening for receiving wires.

Wire clamping jaws 16 and 18 are slidably mounted in the front wall of the housing portion 14a so that the cables or wires can be passed between these jaws, through the housing, and through the conduit C to exit the wall structure on the other side (see FIGS. 2 and 3A–H). An identical device to that described above is also provided at the other side of the wall structure to provide a fire stopping system for both ends of the conduit C. (see FIG. 1)

Figure 3A:
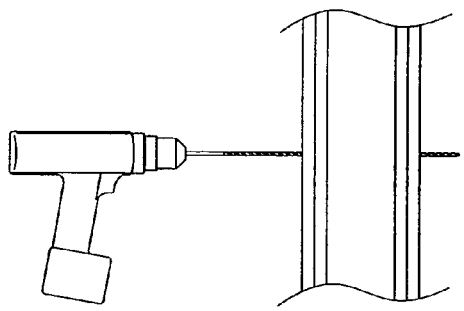
Figure 3B:
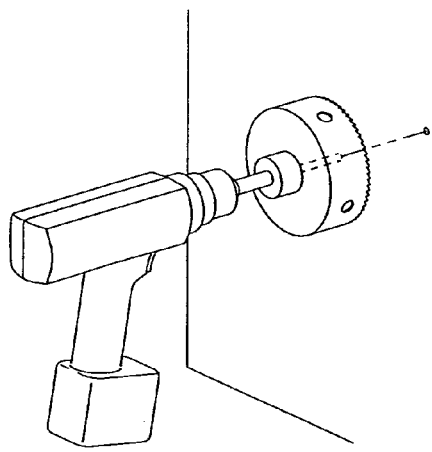
Figure 3C:
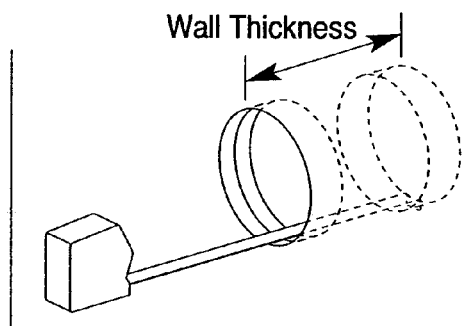
Figure 3D:
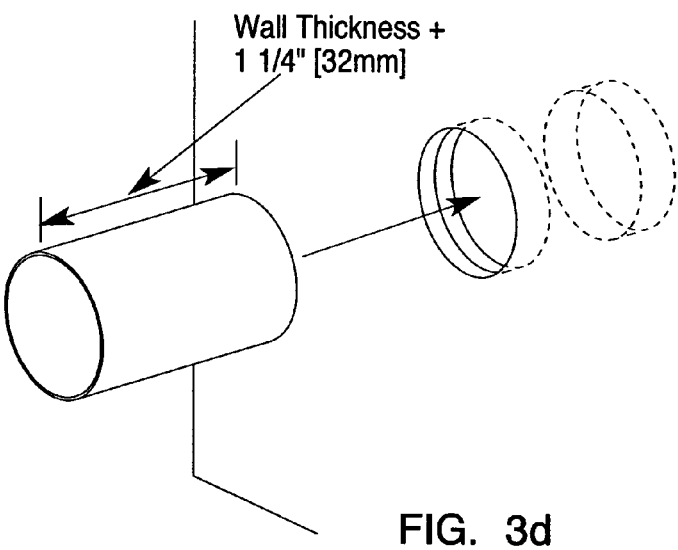
Figure 3E:
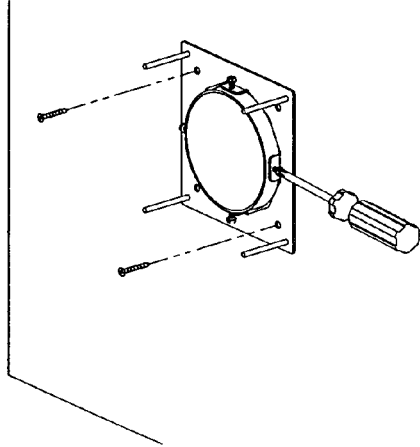
Figure 3F:
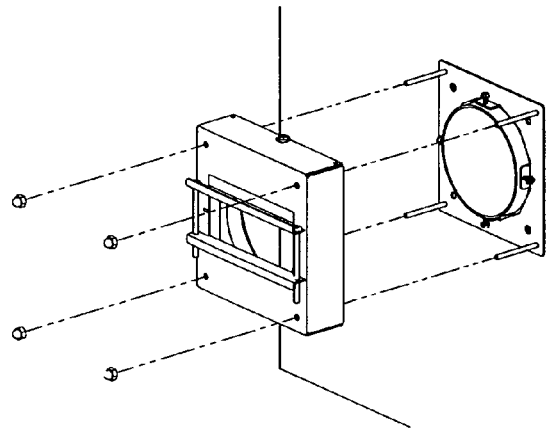
Figure 3G:
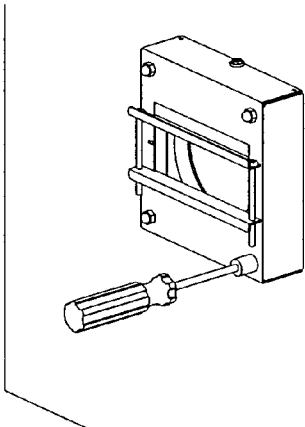
Figure 3H:
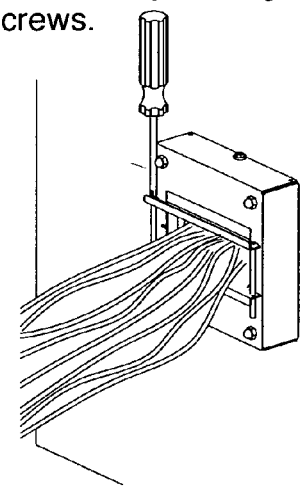

FIG. 1 shows the jaws in open condition, and FIG. 3H the jaws are closed, in a final dosing step. Two sheets of intumescent material are provided in the rectangular housing, as best shown in FIG. 1, for expansion in response to heat, for sealing the area around the wires, and hence to prevent the passage of hot air and smoke from one side to the other side of the wall structure W (through the conduit C).

The reader is referred to the prior co-pending application, incorporated herein by reference, for a more detailed description of the embodiment illustrated in FIGS. 1, 2, and 3. It will be apparent that this configuration is intended for so called "new construction", where the conduit and the fire stop devices are assembled to the conduit prior to feeding the cables and wires through the wall structure. As described below with reference to FIGS. 4, 5, and 7A–7D improved embodiment of this invention is designed for retro-fit application to service wall structures that already have wires through an opening in the wall structure. Such a retro-fit system is required when a building must be brought up to code, by providing fire stops on one or both sides of a wall structure. It is an important feature of the embodiment to be described below that it can also be used in new construction, and could be used in place of the unit described above with reference to FIGS. 1, 2 and 3A–3H.

DETAILED DESCRIPTION OF FIGS. 4,5,6 and 7A–7D

Figure 7A:
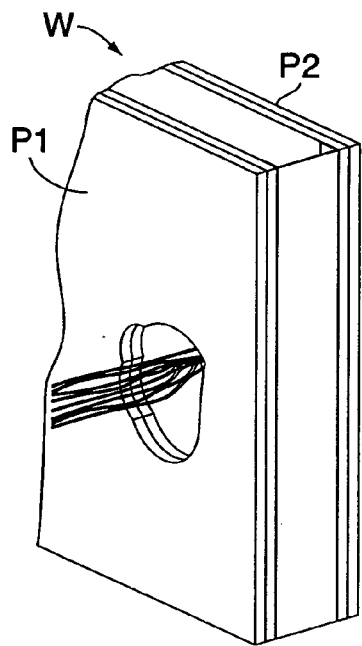
Figure 7B:
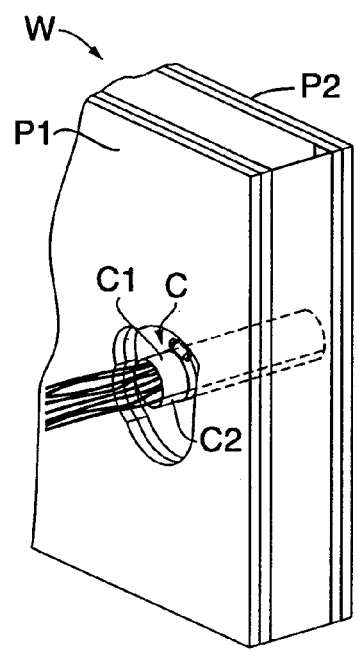

In a pre-existing wall structure, with an opening in which cables are already run, one might or might not find a conduit in the wall opening. Therefore, this improved version will be described with reference to a wall such as shown in FIG. 7A, but if a preexisting conduit is in place steps 7A and 7B can be ignored. The split conduit $C_1$ and $C_2$ is placed around the wires in two half sections. These conduit half sections are assembled around the wires and held in place by a conventional clamp as shown in FIGS. 4 and 5.

Figure 7C:
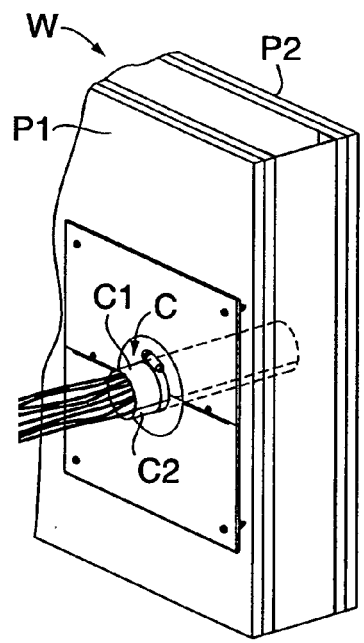
Figure 7D:
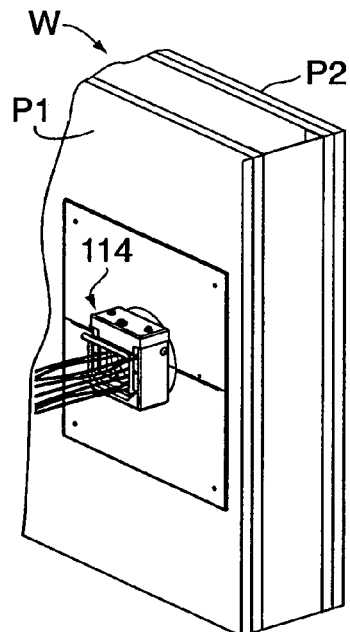

In the event that the opening is not of suitable size for such a conduit, the opening can be enlarged. If the opening is excessively large it can be reduced in size by fitting a split plate to the wall, as shown in FIG. 7C. The split plate is formed in two half sections for this purpose as shown in FIG. 8.

In accordance, with the present invention, the assembled conduit will be similar to that described previously at C with reference to the first embodiment, and such conduit preferably extends at least somewhat beyond the wall structure (and beyond the plate if required) so as to receive the back side of a housing, such as that shown at 114 in FIGS. 4 and 5.

Since the wire and/or cables will not be disturbed in retrofitting this device in a wall structure with a conduit in accordance with the present invention, the housing 114 is provided in three parts, a lower housing part 115, shown to best advantage in FIG. 6, a top part 117 for assembly with the lower part 115 and a U-shape back plate to be described. The lower part 115 defines an upwardly open interior recess that is adapted to receive the intumescent block materials indicated generally at 50 in FIG. 6. These intumescent materials are flexible enough to be spread apart for placement around the conduit C prior to sliding the lower housing part 115 and the intumescent components upwardly into position around the conduit.

The housing 114 further includes a back plate 116 that cooperates with the rear wall of the housing lower part 115. This back plate 116 is installed just inside the rear wall 115a of the lower portion 115 as shown to best advantage in FIG. 5. Thus, the back plate 116 is free to move vertically with respect to the lower housing portion 115. A top housing portion 117 is adapted for assembly with flanges on the legs of back plate 116, and forms the upper boundary of the interior recess of housing 114. The conduit C is used to support these top and bottom housing portions. The mechanism by which the housing 114 is secured to the end of the conduit is shown in FIGS. 5A and 5B. FIG. 5A shows the housing lower portion 115 (and back plate 116) loosely held together with the top housing portion 117 by clamping screws 118, 118. In this loosely assembled condition these components can be slid onto the end of conduit C. Conduit C can be of the split style shown in FIG. 5, or of one piece as shown in FIGS. 1, 2, and 3A–3H. Tightening screws 118, 118 draws the U-shaped back plate 116 towards the housing top portion 117 creating four points of contact at the locations indicated in FIG. 5B. Thus, housing 114 is securely clamped to the end of the conduit C in a manner that minimizes the contact area between conduit C and the housing itself. Since the conduit can be expected to get hot from heat generated by any fire in the space on the other side of the wall structure it is important to delay the transfer of heat to the housing, and hence to the cables that run through the housing, into the space on the side of the wall where the housing is located.

A top part 117 of the housing 114 receives the flanges defined on legs of the U-shaped back plate 116 and attachment screws 118 secure these components, clamping the conduit as shown in FIGS. 5A and 5B. The angled sides of the rear wall 115 (indicated at 115D) engage the upper side of the conduit C, and as the screws 118 are tightened the back plate 116 is drawn upwards towards cover 117 so that the angled edges 116a of the back plate engage the lower side of the conduit C. In this manner the four angled edges 115b, 11b and 116a, 116a cooperate to anchor the housing 115 to the end of conduit C. A U-shaped adhesive pad 112 may be used on the back of the plate 116 in order to facilitate installation of the plate 116 to the wall structure. This pad aids in securing the back plate to the associated conduit and to the wall structure. If necessary a second adhesive strip 113 associated with the cover portion 117 can also be used for the same purpose.

Turning next to the front side of the rectangular housing 114, FIG. 4 shows the wire or cable clamping jaws 16 and 18, (similar to those described previously with same reference to 16 and 18 in the first embodiment) in an open condition. The screws 20 are used to move the upper and lower jaws into clamping relation to the cables to minimize the area of linear slot provided for passage of the cables into and through the housing and conduit.

Although, the intumescent block 50 is shown as a unitary item in this embodiment it is also possible to provide other configurations for the intumescent material, either in the form of individual strips, or perhaps thinner wafers such as shown in the previous embodiment, to facilitate encircling the conduit during installation, or of the housing as described above.

FIG. 8 shows a wall structure W having, from left to right, a fire stop housing 114 provided on a conventional conduit such as would be used in new construction, and at the center, the same device 114 provided on a conduit that extends well beyond the wall panel P. A segmented heat shield 150 is provided between the wall panel P and the device 114. At the near side, the fire stop device 114 is provided on a split conduit installed after a split wall plate is installed. This right hand assembly represents a typical retro-fit installation.

FIGS. 9A–C shows a segmented heat shield of C-shaped configuration designed for use by the installer to accommodate a variety of projecting conduit configurations.

We claim:

1. A device for use in a wall structure having an opening, a conduit for placement in the opening, a generally rectangular housing defining an interior, said housing having a rear wall formed at least in part by a back plate separate from said rear wall, said plate oriented perpendicular to the conduit's center line, intumescent material provided in said rectangular housing interior, said housing having a front wall provided in spaced relation to said rear wall, and cable clamping jaws provided at said front wall and defining an adjustable linear slot for receiving the wires passing through said conduit and through said housing, and means for adjusting said clamping jaws to minimize the cross sectional area occupied by the wires at said slot in said front wall of said housing.

2. The device according to claim 1 wherein said housing has separable top and bottom housing components, said housing components being slidably received with respect to one another, and screw fasteners for drawing said plate toward said top housing component with a gripping force sufficient to secure said housing to the conduit.

3. The device according to claim 2 wherein said intumescent material in said housing lower component has a U-shape for receiving said conduit.

4. The device according to claim 1 wherein said wire clamping jaws comprise parallel j-shaped jaw elements slidably supported in the front wall of said housing, and said adjusting means comprising screw fasteners for moving said jaw elements toward and away from one another so as to clamp the wires in said elongated generally linear slot defined by said jaw elements.

5. The device according to claim 1 wherein said housing has a fixed rear wall, and said separately formed back plate slidably mounted relative said fixed rear wall, both said back plate and said fixed rear wall defining angled abutment edges on complementary U-shaped leg portions for engaging the conduit, and said housing having a top portion spanning the legs of said U-shaped back plate with clamping means accessible from outside said housing to urge said back plate abutment edge toward said housing rear wall abutment edges for clamping the housing to the conduit.

6. The device according to claim 5 wherein said clamping means comprises threaded fasteners provided in openings formed by said housing top portion, and threaded openings in said back plate legs for threadably receiving said threaded fasteners.

7. A method for sealing cables carried by a conduit through a wall structure, said method comprising:
providing a generally U-shaped lower housing portion having intumescent material provided therein,
arranging said U-shaped housing on one end of the conduit, adjacent the wall structure,
placing a top housing portion on the upper ends of leg portions of the U-shaped housing,
securing the top housing portion to the U-shaped lower housing portion to clamp the resulting housing assembly rear wall onto the conduit
providing wire clamping jaws at a front wall of the housing to define an adjustable linear slot for receiving wires passing through the conduit and through the housing.

8. The method according to claim 7 further including adjusting the clamping jaws to minimize the cross-sectional area occupied by the wires at said front wall of said housing.

9. The method according to claim 7 further including the additional step of providing intumescent material in the housing for expansion in response to heat.

10. A method for sealing at least one end of a conduit having cables through in the conduit for passage through a wall structure, the improvement comprising:
providing an upperwardly open U-shaped housing at one end of said conduit without disturbing the cables,
providing a housing top portion fitted to the upper ends of the legs of the lower U-shaped housing portion,
bringing said top and bottom housing portions together so as to mount the resulting housing assembly at the end of the conduit, and adjacent the wall structure,
providing wire clamping jaws on the side of the housing opposite the side mounted to the end of the conduit, and adjusting said jaws to minimize the opening required for passage of the cables there through, and
providing intumescent material in the housing for expansion in response to heat, for sealing the end of the conduit against the pressure of gases produced by fire or smoke in the conduit.

11. The method of claim 10 further including the additional step of providing a rear wall for said housing and adhering said housing rear wall to said wall structure, prior to assembling said housing top and bottom portions.

12. The method of claim 10 further including the preliminary step of assembling the conduit from at least two conduit sections that are shaped to allow assembly of the conduit in the wall structure with the cables running through an opening in the wall structure.

13. The method of claim 12 further including the preliminary step of providing a split cover plate on the wall structure prior to assembling the conduit sections around the cables.

14. The method of claim 12 further including the preliminary step of providing a segmented heat shield of separable sections shaped to fit around the assembled conduit sections between the housing assembly and the wall structure, and shaping said segmented heat shield sections together so they encircle the conduit between the assembled housing and the wall structure.

* * * * *